Patented May 20, 1947

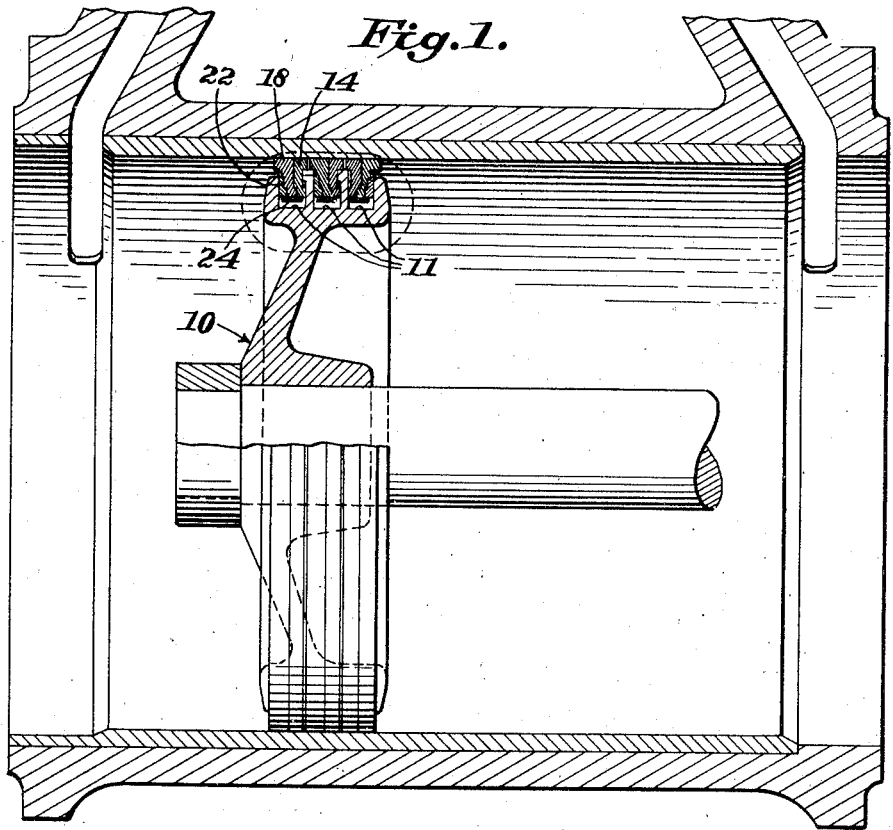
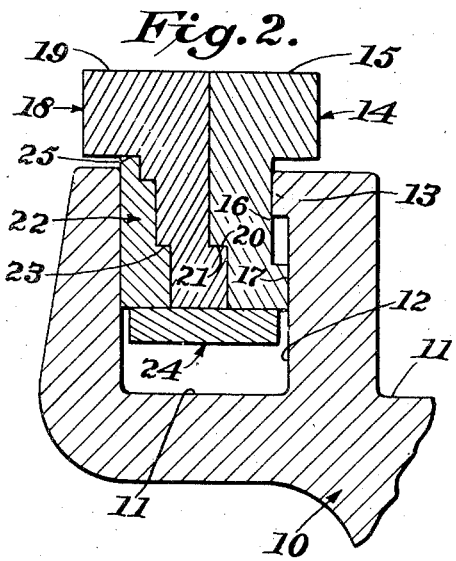
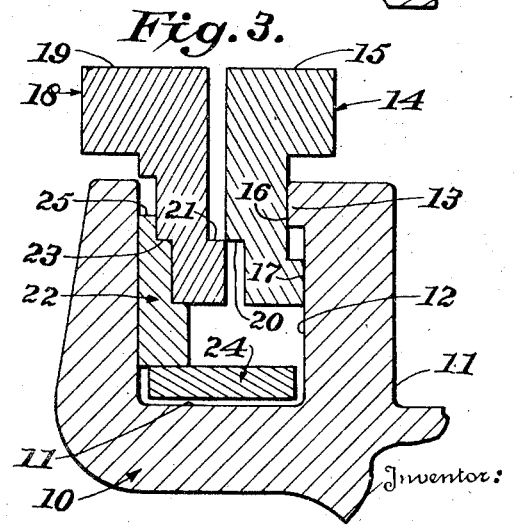

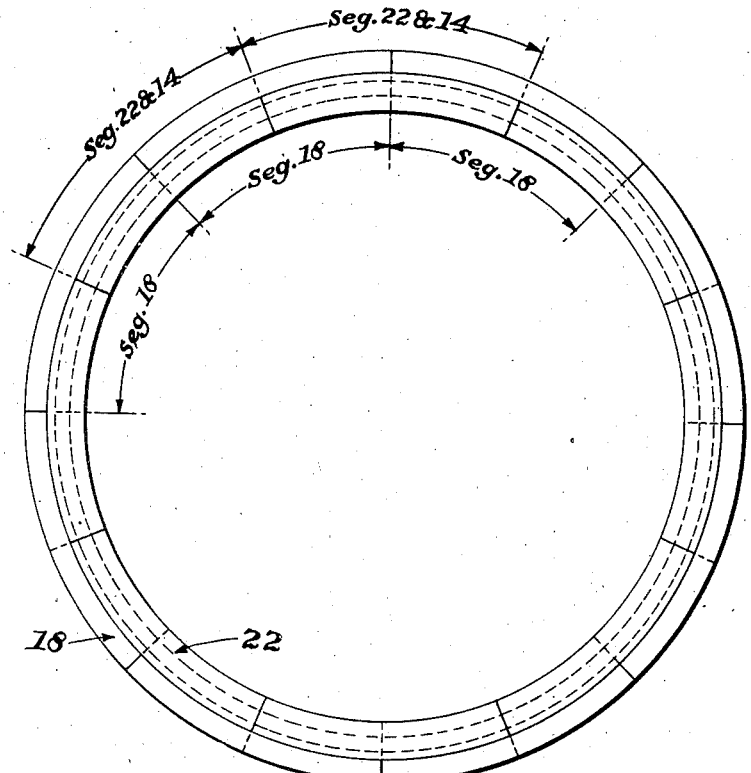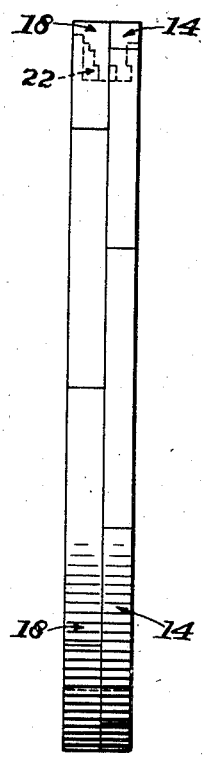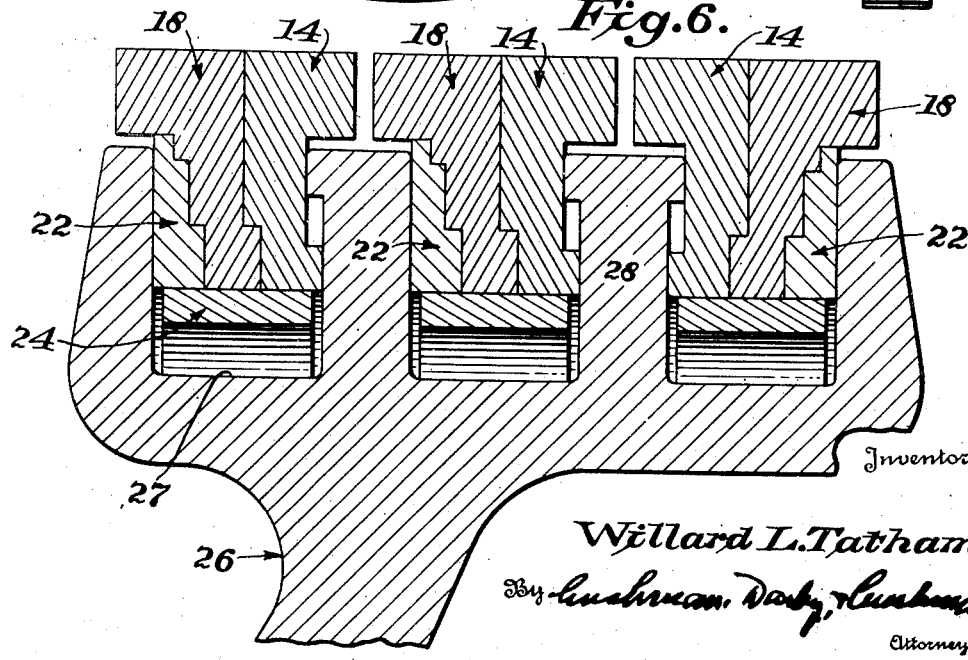

2,420,690

UNITED STATES PATENT OFFICE 2,420,690

PISTON PACKING RING ASSEMBLY

Willard L. Tatham, Decatur, Ill.

Application October 12, 1944, Serial No. 558,352

6 Claims. (Cl. 309—44)

The present invention relates to piston rings and pistons for use with engine cylinders, being adapted to any type of engine operating on compression and exhaust principle, and has for its object to provide a construction in which assembly and disassembly of pistons and rings may be conveniently and expeditiously accomplished. Further, the piston head and rings are so constructed and assembled that they will be retained in their relative positions without the need of fastenings, such, for example, as dowel pins or separate piston head parts, to maintain an operative assembly, all of the parts, both piston and rings, being of one piece construction and so shaped as to lend themselves to accurate and secure interlocking in final position without the necessity of additional fastening means. Again, the parts are of such form that they may be conveniently shaped on usual machine or shaping equipment, without the necessity of special and complicated operations.

Broadly stated, the invention contemplates a one-piece piston head having one or more ring-receiving grooves so shaped as to permit insertion and removal of the rings, while ensuring their retention against accidental displacement when once fitted, and a plurality of rings, each of which rings is made up of segments, which segmental rings interlock with the groove in the piston head, and with each other, so as to provide an unbroken multiple ring contact surface to engage the cylinder wall; such ring members being held in symmetrical radially expanded positions so as to ensure at all times proper relation of the contacting surfaces and give maximum compression or exhaust.

One embodiment of the invention is disclosed in the description which is here given and in the drawings which accompany and form a part of this disclosure, but it will be understood that this disclosure is illustrative and not restrictive, as mechanical variations from the disclosure here made can be adopted and still be within the purview of the invention.

In the drawings—

Figure 1 is a view in section of a portion of a cylinder, and a piston head having a plurality of grooves, with the rings in assembled condition in the piston grooves, Figure 2 is a sectional view of a portion of a piston head having a single groove, showing the manner of assembling the rings in the grooves, Figure 3 is a view in section of a portion of a piston head and rings showing a final step in ring assembling, Figure 4 is a view in elevation showing the ring members in assembled position, Figure 5 is an edge view of the assembled ring parts.

Figure 6 is an enlarged sectional view of a portion of a piston head, similar to the assembly of Fig. 1, having a plurality of ring grooves and ring assemblies.

In the specification numerals are used to designate the parts of the drawings and, in the several views, like numbers indicate like parts.

Referring to Figure 1, 10 designates a piston head, the entire head preferably being formed of one integral piece. Formed in the rim of the head 10 are ring grooves 11, which are machined or otherwise produced, the grooves 11, as here shown, being of plain rectangular form with an open mouth, one of the side walls 12 of the grooves 11 being undercut to provide ribs 13 to engage and interlock with one ring member and prevent accidental displacement of the segmental ring assembly when that assembly has been completely installed. The construction is such, however, that the ring members, now to be described, can be readily assembled in the groove in interlocked operative relation.

Each ring assembly is made up of a plurality of ring members built up of segments, three rings being here shown, and comprises the segmental ring member 14 having an outer cylinder contact surface 15 and a side wall 16 to engage the undercut wall 12 of the piston groove 11, the side wall 16 having a rib 17 to engage the rib 13 on the wall 12 of the groove 11 and limit outward movement of the ring 14 and its interlocked assembly to prevent accidental displacement of the ring parts.

Adjacent ring member 14 is a second ring member 18 made up of segments, the outer cylinder contact surface 19 of which registers with the contact surface 15 of ring 14 and may be of the same or substantially the same transverse surface dimension. Ring 18 will interlock against independent outward radial movement relative to ring 14 by means of the interengaging ribs 20 and 21 on their abutting faces.

When segmental ring members 14 and 18 have been assembled as shown in Figure 2 with their segments built up into a ring assembly and in interlocked relation with each other and with the undercut wall 12 of the piston groove, the assembly will be completed by inserting a segmental ring member 22 into interlocked engagement with ring 18, ring members 22 and 18 having corresponding interengaging notches 23 to maintain them in proper relation.

In assembling the ring members, a ring member 14 will be placed in position, a ring member 18 nested therewith in locked relation, and the ring member 22 will then be nested in place in its proper relation to ring 18 by sliding it circumferentially of the groove with its notches engaging with the notches in ring 18. This will be continued up to the insertion of the last two segments of ring 18, at which point the ring segment 22 will be inserted by raising ring segments 14 and 18, as shown in Figure 3, inserting ring segment 22 radially, as distinguished from the circumferential insertion heretofore referred to, and thereupon the last two ring segments of ring 14 and the segment of ring 18 will be moved radially to their final position.

The ring members described all rest, with their inner circumferential surfaces aligned, upon a circumferentially placed spring 24 which tends to hold the entire assembly radially expanded in closely nested and interlocked position. It will be seen that under these conditions the plural ring assembly will act as a unit. Ring 14 is held against unlimited outward displacement by the rib 13 on the undercut wall 12 of piston groove 11, which is engageable by the rib 17 on the ring 14; the adjacent ring 18 is interlocked with ring 14 by the ribs 20 and 21 to prevent independent outward radial movement of ring 18 or independent inward radial movement of ring 14, and the ring 22 interlocked with ring 18 by notches 23, holds both rings 14 and 18 interlocked against independent inward radial movement. The entire ring assembly becomes a unit supported by the spring 24 and radially projected outwardly under spring pressure, outward radial movement of the unit being limited by the rib 13 on the side wall 12 and the rib 17 on the abutting rib 14, as heretofore described. With this construction, the ring assembly is locked in the piston ring recess at all times and cannot be displaced therefrom except by dis-assembling the interlocked segments which make up the assembly.

It will be seen that the upper edge or lip 25 of ring 22 extends beyond the circumference of the piston head 10, as shown in Figure 1, so that the rings 14 and 18 will have sufficient clearance for slight play of the ring unit relative to the spring unit 24 and provide always an elastic contact with the ring assembly and cylinder wall.

In Figures 4 and 5 the segmental ring unit is shown in elevation and edge views, respectively, in assembled condition. It will be seen the segments of ring 14 and those of ring 18 are overlapped so as to break joints between the segments which make up the ring members and give stability to the assembly. The segments of the interlocking ring 22 which interlock with the segments of ring 18 are also lapped on the adjoining ends or joints of the segments of ring 18 so that the unit presents a fully lapped, interlocked, and stable assembly.

In Figure 6 is shown a portion of a piston ring 26 having a plurality of grooves 27 in which are mounted ring assemblies built up as heretofore described. Where a plurality of grooves are used it may be found preferable to undercut a wall partition such as 28 on its opposite side walls and reverse the assembling of the segments on opposite sides of such partition so that assembly of the ring segments may be more conveniently made as the assembling of the ring members proceeds from groove to groove in the manner described. Furthermore, the forming or machining of the undercuts in opposite sides of a single partition wall can be accomplished simultaneously and eliminate the undercutting of single faces on succeeding partition walls.

In a plural ring assembly, such as the three ring assembly shown in Figs. 1 and 6, the outside rings are in reversed or opposite relation. This preferably for the reason that should the piston overtravel into the counterbore of the cylinder the segments cannot drop into the counterbore. Ring 14 laps ring 18, and ring 18 laps ring 22, so that in event of overtravel of the piston this overlapped relation of the rings will prevent any dropping of the ring segment.

It will be understood that the ring segments may be of any desired length compatible with the securing of a proper assembly, and that the number of segments used will depend on the diameter of the assembly desired, the length of the segments being related, of course, to the diameter to give a proper proportioning of the segments in the final assembly.

This disclosure, as stated, is illustrative and not restrictive, and from this disclosure other mechanical expedients involving the same principle will suggest themselves. It is to be understood that the invention is not limited to structural details except insofar as the invention is expressed in the appended claims.

I claim:

1. A piston ring assembly comprising a plurality of segments interlocked with one another against outward radial movement independently of each other and disposed in circumferentially lapped relation to form a continuous cylinder wall contact surface, means on one of said rings to limit outward radial movement of the assembly in a piston recess, and another segment interlocked with one of said first-named segments against outward independent radial movement and acting to prevent independent movement and lateral shifting of said first-named segments in the recess of a piston head.

2. A piston ring assembly comprising a plurality of segments interlocked with one another against outward radial movement independently of each other and disposed in circumferentially lapped relation to form with said first named segment a continuous cylinder wall contact surface, means on one of said rings to limit outward radial movement of the assembly in a piston recess, another segment interlocked with one of said first-named segments against outward independent radial movement and acting to prevent lateral shifting of said first-named segments in the recess of a piston head, and a spring engaging all of said segments and tending to maintain the segments of the ring assembly always in interlocked and radially extended position.

3. The combination with a piston having a ring receiving recess with an undercut wall, a ring segment radially movable in the recess and engaging its undercut wall to limit outward radial movement, a second ring segment in lapped relation to said first segment and engaged therewith against independent outward radial movement and forming with said first-named segment a continuous cylinder wall contact surface, and a third ring segment in lapped relation to said first ring segment and engaging said second ring segment to prevent its independent outward radial movement and hold the ring assembly against lateral shifting in the recess.

4. The combination with a piston having a ring receiving recess with an undercut wall, a ring segment having an undercut face radially movable in the recess of said piston and engaging its undercut wall to limit outward radial movement, a second ring segment in lapped relation to said first segment and interlocked relative to said first segment against independent outward radial movement and form with said first-named segment a continuous cylinder wall contact surface, and a third ring segment in lapped relation to said first ring segment and having a recessed wall engaging said second ring segment to prevent independent outward radial movement of said third segment and hold the ring assembly against lateral shifting in the recess.

5. The combination with a piston having a ring receiving recess with an undercut wall, a ring segment having undercut faces radially movable in the recess of said piston and engaging with one of its faces the undercut wall of the recess to limit outward radial movement, a second ring segment in lapped relation to said first segment and having an undercut wall to engage the opposite undercut face of said first segment and be held against independent outward radial movement and form with said first-named segment a continuous cylinder wall contact surface, a third ring segment in lapped relation to said first ring segment and having a recessed wall engaging said second ring segment to prevent independent outward radial movement of said third segment and hold the ring assembly against lateral shifting in the recess, and a spring engaging the lower faces of said segments to maintain them in interlocked relation and always in radially extended position.

6. The combination with a piston having a ring receiving recess the inner side wall of which is undercut, a ring segment having undercut faces radially movable in the recess of said piston and engaging with one of its faces the inner undercut side wall of the recess to limit outward radial movement, a second ring segment in lapped relation to said first segment and having an undercut wall to engage the opposite undercut face of said first segment and be held against independent outward radial movement and form with said first-named segment a continuous cylinder wall contact surface, a third ring segment in lapped relation to said first ring segment and having a recessed wall engaging said second ring segment to prevent independent outward radial movement of said third segment and hold the ring assembly against lateral shifting in the recess, and a spring engaging the lower faces of said segments to maintain them in interlocked relation and always in radially extended position.

WILLARD L. TATHAM.

REFERENCES CITED

The following references are of record in the file of this patent:

UNITED STATES PATENTS

| Number | Name | Date |
| --- | --- | --- |
| 2,237,010 | Muchnic | Apr. 1, 1941 |
| 1,595,890 | Taylor | Aug. 10, 1926 |
| Re. 20,674 | Morton | Mar. 15, 1938 |